Patented Mar. 2, 1948

2,436,978

UNITED STATES PATENT OFFICE 2,436,978

REINFORCING CORD AND PROCESS OF MANUFACTURE

George P. Standley, Cleveland Heights, and Kenneth M. McLellan, Cleveland, Ohio, assignors to Industrial Rayon Corporation, Cleveland, Ohio, a corporation of Delaware No Drawing. Application July 26, 1944, Serial No. 546,750

21 Claims. (Cl. 57—140)

1

This invention relates to cord structures made from nonmetallic filamentary materials and, more particularly, it relates to cord structures which may be used as reinforcing materials in rubber products. The invention provides new and improved cord structures as well as a new method by which such structures may be advantageously produced.

In the production of reinforced rubber products such as, for example, rubber tires, belts, hose and the like, it is common practice to use a twisted cordlike material to reinforce the rubber structure. The cord is commonly made by twisting a suitable organic nonmetallic filamentary material such as, for example, cotton, rayon or nylon. The cord structure may, for example, be made by twisting together one or more strands of yarn which has been subjected to an initial twisting operation, or the cord structure may consist simply of a heavy strand of a material such as, for example, rayon having a denier in excess of 1500 which has been twisted a desired number of turns per inch.

The twisting operations to which the materials making up the cord are subjected in producing the cord generally result in a reduction in strength of the original yarn. To minimize such loss in strength, it is common practice to apply lubricants of various types to the yarns before they are subjected to the twisting operation. While such lubricants may be effective to minimize loss in strength resulting from the twisting operations, they in many instances have an adverse effect on the properties of the cord when it is used as a reinforcing material in the production of, for example, rubber tires. For such purposes the reinforcing cord should not only have certain strength characteristics, but should also have properties such that it can be made to adhere satisfactorily to the rubber structure and also have the capacity to withstand the repeated flexing to which the tire is normally subjected in the course of its use.

This invention provides a tire cord structure of at least 500 denier made from twisted filamentary material which filamentary material has been treated with a lubricant which not only minimizes loss in strength of the yarn due to twisting operations, but also results in a cord product which adheres satisfactorily to a rubber structure and has a high flex life or fatigue resistance. In general, the new cord of the invention is made from nonmetallic filamentary material which has been treated with an ester of a fatty acid containing at least 12 carbon atoms and a polyhydric

2 alcohol such as the hexahydric alcohols and their anhydro derivatives.

The ester or, more specifically, the alcoholic residue of the ester may be derived from such polyhydric alcohols as sorbitol, mannitol, dulcitol or the anhydro-derivatives of such alcohols as, for example, sorbitan, mannitan, sorbide, mannide, etc. The fatty acids containing at least 12 carbon atoms may include lauric, myristic, palmitic, stearic and unsaturated or hydroxy acids such as oleic, ricinoleic, etc. The esters may be either mono or poly esters and should advantageously have a melting point above 30 C. Among the specific esters which may be employed with advantage may be mentioned sorbitol tetrastearate, sorbitan monopalmitate, sorbitan monolaurate, mannitan monopalmitate, mannide monooleate, etc.

Although the ester may be applied to the filamentary material in the molten or undiluted form, it is more advantageously applied in a diluted form such as a solution or dispersion depending somewhat upon the degree of solubility or dispersibility of the ester in the medium employed. In the case of an ester such as, for example, sorbitan monopalmitate, it is advantageous to use an aqueous dispersion containing a small quantity of the palmitate together with a small amount of a suitable dispersing agent such as, for example, triethanolamine. Other alkaline dispersing agents may also be used if desired. The aqueous dispersion advantageously contains from about .05% to 3.0% of the ester.

The ester is applied to the filamentary material prior to the various twisting and cord construction operations and the treated filamentary material may, if desired, be dried before being subjected to twisting. In the production of cord structures from materials such as continuous multifilament viscose rayon yarn, it is particularly advantageous to treat the yarn before it has been subjected to the first drying stage normally incident to its production. This may be done with especial advantage when the viscose rayon is produced by the continuous process as described, for example, in Torrence Patent No. 2,284,497 by applying the ester emulsion or dispersion to the viscose rayon just prior to the delivery of the yarn to the drying reel on which the yarn is continuously dried prior to twisting. The amount of ester deposited on the yarn as a result of the treatment advantageously ranges from about 0.1% to 4.5%, by weight, of the yarn.

The invention will be more fully described by reference to the following examples although it

Example 1

100 parts, by weight, of sorbitan monopalmitate were melted and mixed with 1 part, by weight, of triethanolamine as a dispersing agent. 400 parts of water at room temperature were added and the mixture passed through a colloid mill to yield about a 25% dispersion. This dispersion was then diluted with sufficient water so that it contained about 0.35%, by weight, of sorbitan monopalmitate.

The above dispersion was applied to a wet, freshly spun and processed 1100 denier, 480 filament viscose rayon yarn while it was being temporarily stored on a thread-advancing, thread storage reel just prior to the drying stage of a continuous rayon spinning and processing machine as described, for example, in Torrence Patent No. 2,284,497. The yarn was treated for about ten to fifteen seconds. The treated yarn was then continuously advanced to a succeeding thread-advancing, thread storage device upon which it was dried. Thereafter, the yarn was given about 1.5 turns per inch of Z-twist and collected on a spool. The resulting yarn thereafter had its twist increased to about 14 turns per inch of Z-twist and two strands of the resulting Z-twisted yarn were then plied together with about 12½ turns per inch in the opposite direction (S-twist). Ether extraction of the resulting cord showed that 0.33%, by weight, of sorbitan monopalmitate was present on the filamentary material used in forming the cord. The cord had high tensile strength and excellent fatigue resistance.

Example 2

A .35% aqueous dispersion of manitan monopalmitate was prepared and applied to a viscose rayon thread in the manner and under the conditions set forth in Example 1 with the exception that the 1100 denier, 480 filament thread was given a total of about 17 turns per inch Z-twist and two ends thereof plied with about 11½ turns per inch S-twist. The cord had high tensile strength and excellent fatigue resistance.

Example 3

A .35% aqueous dispersion of sorbitan monolaurate was prepared and applied in the manner described in Example 1, i. e., with similar thread and twist structure but without the use of the dispersing agent triethanolamine. The cord had high tensile strength and excellent fatigue resistance.

Example 4

A .35% mannide monooleate aqueous dispersion without a dispersing agent was prepared and applied in the manner of Example 1. In this case, the 1100 denier, 480 filament viscose rayon thread was given a total of about 17 turns per inch Z-twist and two ends thereof plied with a 11½ turn per inch S-twist. The cord had good tensile strength and fatigue resistance.

Although the foregoing examples have illustrated the application of the invention to cord produced by plying strands of twisted 1100 denier filament rayon, it is to be understood that the invention is not intended to be limited thereto. The invention may be employed with advantage in producing cord structures having a denier of at least 500 and made from organic filamentary material, especially in producing plied cord structures from yarns in which the strands forming the cord structure have been twisted to at least ten turns per inch.

The invention may be applied with particular advantage to cord structures made by plying together two or more strands of organic filamentary material each having a denier of at least 1000 and in which the strands have been given a twist in one direction of from about five to twenty turns per inch and in which the twisted strands have then been plied into a cord by giving them a ply twist in the opposite direction of about five to fifteen turns per inch.

The invention may also be applied to the production of cords from filamentary material having a denier of at least 1500 which is subjected to at least one and one half turns per inch of twist including such structures as are described, for example, in Patent No. 2,103,245 to E. G. Budd.

Although the invention may be used with particular advantage in the production of cord products from viscose rayon, it is also applicable to the production of cord structures from other types of nonmetallic filamentary materials. These may include, for example, organic, natural or artificial filamentary materials among which may be mentioned such natural cellulosic filamentary materials as cotton, flax, hemp, ramie, etc., and such artificial yarns as those made from regenerated cellulose by the viscose or cuprammonium process as well as cellulose ethers and cellulose esters, the latter including cellulose acetates and deacylated cellulose acetate fibers.

The invention may also be employed in producing cord structures from such artificial organic fibers as those produced from polymerized polyamides, e. g., nylon, or from hydrocarbon polymers or their derivatives including vinyl, vinylidine and styrene polymers.

When reinforcing structures such as those made, for example, from viscose rayon are used in the fabrication of rubber products such as tires, it is common practice to dip the rayon cord structure in a latex soultion prior to its incorporation in the rubber tire. This operation is performed to promote better adhesion between the cord structure and the rubber tire carcass. Some yarn lubricants interfere with the absorption of the proper amount of latex solution by the cord structure in the dipping operation and they are said to have poor "dip take-up" characteristics. The new cord structures of this invention, however, have satisfactory "dip take-up" characteristics and adhere remarkably well to the tire structures in which they are incorporated. The improved fatigue life, or high flex life, and excellent tensile strength of the new cord structures make possible the production of rubber tires having improved operating characteristics. The new cord structures also have excellent heat resistance and are comparatively less sensitive to high humidity conditions.

We claim:

1. The method of producing a tire cord having a denier of at least 500 which comprises treating a filamentary material with a composition comprising an ester of a fatty acid containing at least 12 carbon atoms with a polyhydric alcohol selected from the group consisting of hexahydric alcohols and the anhydro-derivatives of such alcohols; and thereafter twisting said treated filamentary material at least about 1.5 turns per inch to form said cord.

2. The method of producing a tire cord having a denier of at least 1000 which comprises treating a cellulosic filamentary material with a composition comprising an ester of a fatty acid containing at least 12 carbon atoms with a polyhydric alcohol selected from the group consisting of hexahydric alcohols and the anhydro-derivatives of such alcohols and thereafter twisting said treated filamentary material at least about 1.5 turns per inch to form said tire cord.

3. The method of producing a tire cord having a denier of at least 500 which comprises treating a cellulosic filamentary material with an aqueous dispersion of a composition comprising an ester of a fatty acid containing at least 12 carbon atoms with a polyhydric alcohol selected from the group consisting of hexahydric alcohols and the anhydro-derivatives of such alcohols; drying said treated filamentary material; and thereafter twisting said treated filamentary material at least about 1.5 turns per inch to form said tire cord.

4. The method of producing a tire cord having a denier of at least 500 which comprises treating a cellulosic filamentary material with a composition comprising a sorbitol ester of a fatty acid containing at least 12 carbon atoms; and thereafter twisting said treated filamentary material at least about 1.5 turns per inch to form said tire cord.

5. The method of producing a tire cord having a denier of at least 500 which comprises treating a cellulosic filamentary material with a composition comprising a sorbitan ester of a fatty acid containing at least 12 carbon atoms; and thereafter twisting said treated filamentary material at least about 1.5 turns per inch to form said tire cord.

6. The method of producing a tire cord having a denier of at least 1000 which comprises treating a regenerated cellulose filamentary material with an aqueous dispersion of a composition comprising a sorbitan ester of a fatty acid containing at least 12 carbon atoms; said ester having a melting point of at least about 30° C.; said filamentary material being treated so that it contains about 0.1% to 4.5%, by weight, of said composition based on the weight of said filamentary material; and thereafter twisting said treated filamentary material at least about 1.5 turns per inch to form said tire cord.

7. The method of producing a tire cord having a denier of at least 1000 which comprises treating viscose rayon filamentary material with an aqueous dispersion of a composition comprising sorbitan monopalmitate; drying said treated filamentary material; said filamentary material being treated so that it contains about 0.1% to 4.5%, by weight, of said composition based on the weight of said filamentary material; twisting individual strands of said treated filamentary material at least about 1.5 turns per inch in one direction; and thereafter twisting together a plurality of said treated and twisted strands in the opposite direction to form said tire cord.

8. The method of producing a tire cord having a denier of at least 1000 which comprises treating a regenerated cellulose filamentary material with an aqueous dispersion of a composition comprising sorbitol tetrastearate; drying said treated filamentary material; said filamentary material being treated so that it contains about 0.1% to 4.5%, by weight, of said composition based on the weight of said filamentary material; twisting individual strands of said treated filamentary material at least about 1.5 turns per inch in one direction and thereafter twisting together a plurality of said treated and twisted strands in the opposite direction to form said tire cord.

9. The method of producing a tire cord having a denier of at least 1000 which comprises treating a regenerated cellulose filamentary material with an aqueous dispersion of a composition comprising sorbitan monolaurate; drying said treated filamentary material; said filamentary material being treated so that it contains about 0.1% to 4.5%, by weight, of said composition based on the weight of said filamentary material; twisting individual strands of said treated filamentary material at least about 1.5 turns per inch in one direction and thereafter twisting together a plurality of said treated and twisted strands in the opposite direction to form said tire cord.

10. The method of producing a tire cord having a denier of at least 1000 which comprises treating a regenerated cellulose filamentary material with an aqueous dispersion of a composition comprising mannitan monopalmitate; drying said treated filamentary material; said filamentary material being treated so that it contains about 0.1% to 4.5%, by weight, of said composition based on the weight of said filamentary material; twisting individual strands of said treated filamentary material at least about 1.5 turns per inch in one direction and thereafter twisting together a plurality of said treated and twisted strands in the opposite direction to form said tire cord.

11. A tire cord having a denier of at least 500 and made from twisted filamentary material, said filamentary material having been treated with a composition comprising an ester of a fatty acid containing at least 12 carbon atoms with a polyhydric alcohol selected from the group consisting of hexahydric alcohols and the anhydro-derivatives of such alcohols.

12. A tire cord having a denier of at least 1000 and made from twisted cellulosic filamentary material, said filamentary material having been treated with a composition comprising an ester of a fatty acid containing at least 12 carbon atoms with a polyhydric alcohol selected from the group consisting of hexahydric alcohols and the anhydro-derivatives of such alcohols.

13. A tire cord having a denier of at least 500 and made from twisted cellulosic filamentary material, said filamentary material having been treated with a composition comprising a sorbitol ester of a fatty acid containing at least 12 carbon atoms.

14. A tire cord having a denier of at least 1000 and made from twisted regenerated cellulose filamentary material containing about 0.1% to 4.5%, by weight, of a composition comprising sorbitol tetrastearate.

15. A tire cord having a denier of at least 500 and made from twisted cellulosic filamentary material, said filamentary material having been treated with a composition comprising a sorbitan ester of a fatty acid containing at least 12 carbon atoms.

16. A tire cord having a denier of at least 500 and made from twisted cellulosic filamentary material, said filamentary material having been treated with a composition comprising sorbitan monopalmitate.

17. A tire cord having a denier of at least 1000 and made from twisted and plied viscose rayon filamentary material containing about 0.1% to 4.5%, by weight, of a composition comprising sorbitan monopalmitate.

18. A tire cord having a denier of at least 1000 and made from twisted regenerated cellulose filamentary material containing about 0.1% to 4.5%, by weight, of a composition comprising sorbitan monolaurate.

19. A tire cord having a denier of at least 1000 and made from twisted regenerated cellulose filamentary material containing about 0.1% to 4.5%, by weight, of a composition comprising mannitan monopalmitate.

20. A reinforced rubber structure comprising a tire cord as defined in claim 11.

21. A reinforced rubber structure comprising a tire cord as defined in claim 15.

GEORGE P. STANDLEY.
KENNETH M. McLELLAN.

REFERENCES CITED

The following references are of record in the file of this patent:

UNITED STATES PATENTS

| Number | Name | Date |
|---|---|---|
| 2,126,586 | Dreyfus | Aug. 23, 1938 |
| 2,201,992 | Dreyfus et al. | May 28, 1940 |
| 2,235,867 | Castricum et al. | Mar. 25, 1941 |
| 2,273,200 | Hoff | Feb. 17, 1942 |
| 2,273,636 | Gellendien | Feb. 17, 1942 |
| 2,285,422 | Epstein et al. | June 8, 1942 |
| 2,297,135 | Davis | Sept. 29, 1942 |
| 2,322,822 | Brown | June 29, 1943 |
| 2,340,051 | Goodings et al. | Jan. 25, 1944 |

OTHER REFERENCES

Atlas "Spans and Tweens," published by the Atlas Powder Co., Wilmington, Del., 1942.

Certificate of Correction

Patent No. 2,436,978.                                    March 2, 1948.

GEORGE P. STANDLEY ET AL.

It is hereby certified that errors appear in the printed specification of the above numbered patent requiring correction as follows: Column 2, line 6, for "anhydro-derivatives" read *anhydro derivatives*; column 3, line 39, for "manitan" read *mannitan*; column 4, line 44, for "soultion" read *solution*; line 70, and column 5, lines 5, 15, and 16, and column 6, lines 38 and 39, and lines 46 and 47, for "anhydro-derivatives" read *anhydro derivatives*; and that the said Letters Patent should be read with these corrections therein that the same may conform to the record of the case in the Patent Office.

Signed and sealed this 15th day of June, A. D. 1948.

[SEAL]

THOMAS F. MURPHY,
*Assistant Commissioner of Patents.*

1000 and made from twisted regenerated cellulose filamentary material containing about 0.1% to 4.5%, by weight, of a composition comprising sorbitan monolaurate.

19. A tire cord having a denier of at least 1000 and made from twisted regenerated cellulose filamentary material containing about 0.1% to 4.5%, by weight, of a composition comprising mannitan monopalmitate.

20. A reinforced rubber structure comprising a tire cord as defined in claim 11.

21. A reinforced rubber structure comprising a tire cord as defined in claim 15.

GEORGE P. STANDLEY.
KENNETH M. McLELLAN.

REFERENCES CITED

The following references are of record in the file of this patent:

UNITED STATES PATENTS

| Number | Name | Date |
|---|---|---|
| 2,126,586 | Dreyfus | Aug. 23, 1938 |
| 2,201,992 | Dreyfus et al. | May 28, 1940 |
| 2,235,867 | Castricum et al. | Mar. 25, 1941 |
| 2,273,200 | Hoff | Feb. 17, 1942 |
| 2,273,636 | Gellendien | Feb. 17, 1942 |
| 2,285,422 | Epstein et al. | June 8, 1942 |
| 2,297,135 | Davis | Sept. 29, 1942 |
| 2,322,822 | Brown | June 29, 1943 |
| 2,340,051 | Goodings et al. | Jan. 25, 1944 |

OTHER REFERENCES

Atlas "Spans and Tweens," published by the Atlas Powder Co., Wilmington, Del., 1942.

Certificate of Correction

Patent No. 2,436,978.  March 2, 1948.

GEORGE P. STANDLEY ET AL.

It is hereby certified that errors appear in the printed specification of the above numbered patent requiring correction as follows: Column 2, line 6, for "anhydro-derivatives" read *anhydro derivatives*; column 3, line 39, for "manitan" read *mannitan*; column 4, line 44, for "soultion" read *solution*; line 70, and column 5, lines 5, 15, and 16, and column 6, lines 38 and 39, and lines 46 and 47, for "anhydro-derivatives" read *anhydro derivatives*; and that the said Letters Patent should be read with these corrections therein that the same may conform to the record of the case in the Patent Office.

Signed and sealed this 15th day of June, A. D. 1948.

[SEAL]

THOMAS F. MURPHY,
*Assistant Commissioner of Patents.*